United States Patent [19]

DeAmicis

[11] 3,745,622
[45] July 17, 1973

[54] BATTERY LUG CLEANING TOOL

[76] Inventor: Ferdinando DeAmicis, 6912 Upton Ave. S., Minneapolis, Minn. 55423

[22] Filed: Sept. 14, 1971

[21] Appl. No.: 180,302

[52] U.S. Cl. ............. 29/78 R, 15/104.01 R, 15/236
[51] Int. Cl. ........................................... B23d 71/00
[58] Field of Search...................... 29/78, 81 L, 81 F; 15/104.01, 104.02, 236; 7/4

[56] References Cited
UNITED STATES PATENTS

| | | | |
|---|---|---|---|
| 2,003,629 | 6/1935 | Coffey.......................... | 15/104.01 R |
| 1,913,606 | 6/1933 | McKenna...................... | 15/104.01 R |
| 1,741,531 | 12/1929 | Miller................................. | 15/236 |

*Primary Examiner*—Leonidas Vlachos
*Attorney*—H. Dale Palmatier

[57] ABSTRACT

A storage battery terminal post cleaning tool with handles and arms mounting jaws tapered and arcuately curved to embrace the peripheral surfaces of battery terminal posts; the curvature being less than the curvature of the battery post peripheries to progressively vary the various areas of the abrading faces in engagement with the terminal post during oscillation of the tool in opposite directions; the jaws being swively connected to the arms by balls affixed on the jaws and inserted in sockets in the arms and retained thereon by arm-encompassing spring clips which traverse and obstruct the open ends of the socket openings to confine the balls therein.

6 Claims, 5 Drawing Figures

PATENTED JUL 17 1973

3,745,622

INVENTOR.
Ferdinando DeAmicis
BY
H. Dale Palmatier
ATTORNEY

BATTERY LUG CLEANING TOOL

BRIEF SUMMARY OF THE INVENTION

As a part of the regular maintenance of motor vehicles with internal combustion engines such as automobiles and trucks, the terminal posts of electric storage batteries in these vehicles must be cleaned. However, because of space limitations, the electric storage batteries are often placed in relatively inaccessible locations and access to the terminal posts is somewhat restricted. The present invention is a tool which facilitates reaching into these difficult locations, clamping onto and then abrading the peripheral surfaces of the storage battery terminal posts. Because of the inaccessible locations of the posts, it is highly desirable that the jaws of the abrading tool be self-cleaning during the process of cleaning the terminal posts. The jaws are swively connected to their mounting arms by balls which are affixed to the jaws and sockets which are formed into the mounting arms and by spring clips which encompass the arms and partially traverse and obstruct the open end of the sockets to thereby confine the balls therein.

DETAILED DESCRIPTION OF THE INVENTION

Figure 1:
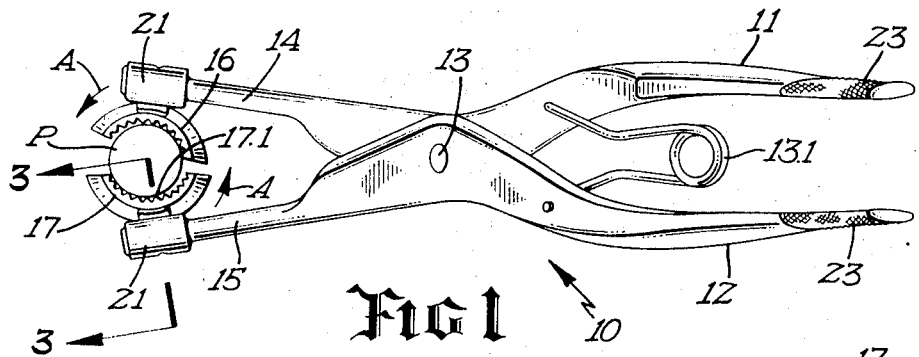
FIG. 1 is a top plan view of the tool applied to the terminal post of an electric storage battery.

One form of the invention is shown in the drawings and is described herein.

The tool is indicated in general by numeral 10 and includes a pair of handles 11 and 12 which are interconnectd by a pivot 13. A pair of jaw-mounting arms 14 and 15 are respectively formed integrally of handles 11 and 12 and are moved by swinging of the handles 11 and 12 about the pivot 13.

A spring 13.1 has its opposite ends attached to the handles 11 and 12 to continuously urge the handles apart and continuously urge the mounting arms 14 and 15 toward one another.

Figure 4:
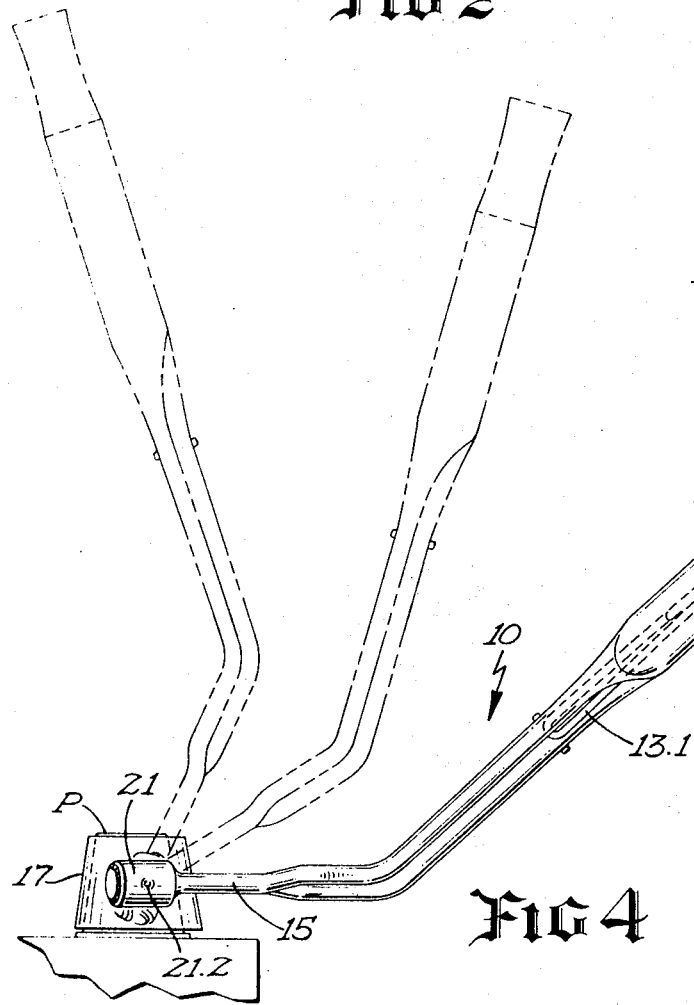
FIG. 4 is a side elevation view of the tool shown applied to the battery terminal post, and also showing the manner in which the handles and mounting arms may be swung to various positions relative to the jaws.

A pair of jaws 16 and 17 are disposed between the juxtaposed mounting arms 14 and 15 to cooperate with each other to embrace and partially encompass the terminal post P of an electric storage battery. The periphery of the post P is circular, but is slightly tapered from top to bottom, somewhat as illustrated in FIG. 4. The jaws 16 and 17 have arcuately curved abrading faces 16.1 and 17.1, respectively, and these abrading faces have curvatures somewhat less than the corresponding curvature of the round peripheries of the battery post P. In addition, the curvatures of the abrading faces 16.1 and 17.1 progressively vary in curvature from one end of the jaws to the other end so that the abrading faces assume a somewhat tapered or conical shape. This tapered or conical shape conforms, generally, to the shape of the tapered post P, except that the curvature of the abrading faces is somewhat less than the curvature of the post periphery.

The jaws 16 and 17 actually have elongate teeth or sharpened ridges 18 which are closely spaced relative to each other to actually make up the respective abrading faces. These teeth 18 extend in a direction longitudinally along and genrally parallel to the axes of curvature of the faces 16.1 and 17.1.

Because of the varying curvature of the abrading faces 16.1 and 17.1, the adjoining teeth 18 converge slightly toward each other, but remain generally parallel to the axes of curvature of the faces.

The jaws 16 and 17 have mounting balls 19 affixed to the rear side thereof, opposite the abrading faces, by means of rigid mounting posts 19.1. The balls 19 project into generally cylindrical socket openings 20 formed in the mounting arms 14 and 15. The socket openings of the arms 14 and 15 are formed on the inner sides of these mounting arms so as to face each other so as to receive the mounting balls 19 and the reduced post 19.1 and confine the jaws 16 and 17 between the mounting arms. As a result of this socket and ball arrangement, the jaws 16 and 17 may turn in multiple directions relative to the mounting arms and be tilted from side to side and up and down and be actually turned around relative to the arms and handles.

The balls 19 are confined within the socket openings 20 by spring clips 21 which are generally C-shaped and which are formed to the size and configuration of the exterior periphery of the arms 14 and 15 so as to snugly fit thereon. The spring clips 21 have the end portions 20.1 formed to embrace the ball-mounting post 19.1 and partially traverse and partially obstruct the open end of the socket opening 20 and thereby retain and confine the ball 19 in the socket opening. It will be understood that the jaws 16 and 17 may be readily and easily removed and replaced as necessary by simply opening the ends 20.1 of the spring clip away from each other and removing the spring clip from the mounting arms. The jaws may then be simply lifted off the mounting arms and replaced.

The spring clips 21 may have a detent 21.2 for insertion into a detent recess 22 in the mounting arm so as to maintain the spring clip in the desired position on the mounting arm.

In operation, it will be understood that the handles 11 and 12 are squeezed together manually to separate the jaws 16 and 17 from each other. These jaws may be applied to the post P of the storage battery and during application of the jaws to the post, the handles 11 and 12 may assume any of a multiplicity of positions relative to the jaws, somewhat as illustrated in FIG. 4, depending upon the requirements of the particular location in which the battery and its post are confined. If necessary, the handles 12 may be completely inverted by swinging around the jaws 16 and 17 from that position illustrated in FIG. 4.

When the jaws 16 and 17 have been applied to the terminal post P, the handles 11 and 12 are released and the spring 13.1 urges the mounting arms and jaws toward each other so as to apply the required pressure between the abrading faces of the jaws and the periphery of the post P.

In order to accomplish the cleaning of the post periphery, the tool 10 is oscillated, first in one direction around the periphery of the post P, and then in a reverse direction around the post P. As the tool 10 is moved first in the direction of arrows A as indicated in FIG. 1, the jaws 16 and 17 will first rock slightly or roll slightly on the periphery of the post so that the leading edge of each of the jaws 16 and 17 lifts off the periphery and the principal engagement between the abrading peripheries of the jaws and the post periphery is in the area near the trailing edges of the arcuate spaces. This prevents any chattering of the jaws on the post periphery and facilitates a smooth sliding and smooth abraiding of the abraiding faces on the post periphery. Of course, the teeth 18 actually remove the scale and corrosion and other contaminants from the post periphery and effectively clean and polish the post.

Figure 2:
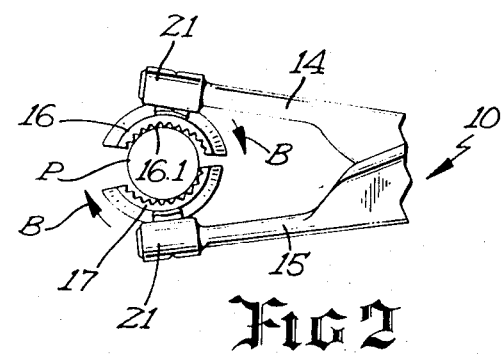
FIG. 2 is a detail plan view of the jaws and mounting arms of the tool being oscillated in a direction opposite to that illustrated in FIG. 1.
Figure 3:
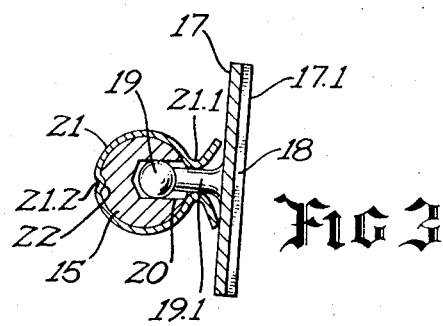
FIG. 3 is an enlarged detail section view taken approximately at 3—3 in FIG. 1.

After the tool 10 has been swung through an arc in the direction of arrow A, it will be swung back in the opposite direction, as indicated in FIG. 2 by the arrows B, and when this occurs, the jaws 16 and 17 rock or roll slightly on the post periphery, and once again, the leading edges of these jaws 16 and 17 are lifted off the post periphery and the principal engagement and abrading action between the abrading faces and the post periphery is spaced rearwardly (in an arcuate direction) behind the leading edge of the arcuate faces of the jaws. Thus, the smooth sliding and smooth abrasion and removal of corrosion and scale is provided for by oscillating these jaws on the post. Of course, during the progressive operation of the tool 10, it may be oscillated several times in opposite directions A and B so as to successively remove all of the undesirable contaminants including scale and corrosion from the post.

During the oscillation of the tool, first in one direction and then the other, the jaws 16 and 17 roll or rock on the post periphery as the direction of movement changes, and the corrosion and scale and contaminants which are removed are allowed to drop away from the teeth 18 on the abrading faces and the tool is thereby self-cleaning. After a particular area of the abrading faces has been used to scrape scale and corrosion off the post, the tool is oscillated in the other direction so as to lift that previously used area off the post and allow the scale and corrosion to drop away while another area of the abrading face is in use.

Figure 5:
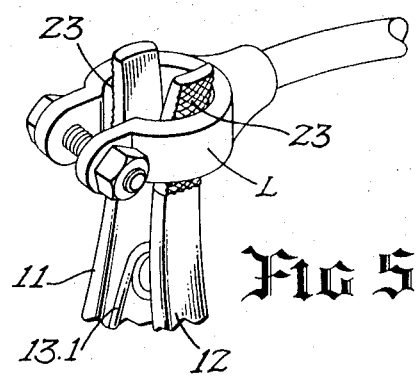
FIG. 5 is an enlarged perspective view illustrating the manner in which the abrading faces at the ends of the handles are used to clean the internal periphery of the battery cable lugs normally attached to the terminal post.

As seen in FIGS. 4 and 5, the handles 11 and 12 are also provided with abrading faces so that these handles may be inserted into the cable lug L and clean the inside periphery of the lug as the handles are successively oscillated first in one direction and then in the other direction within the opening.

It will be seen that I have provided a new and novel battery terminal post cleaning tool having jaws which embrace the post periphery and which have curvature somewhat less than the curvature of the post so as to slightly rock to provide successively different areas of the abrading face to engage the post during oscillation of the tool around the post. In order to facilitate this rocking motion, the jaws are swively connected to the mounting arms, the swivel connection being provided by a socket opening in the mounting arms and a ball affixed to the rear side of the jaw, thus permitting the jaw to turn in multiple directions, according to the requirements of the particular cleaning operation being undertaken.

What is claimed is:

1. A tool for cleaning the periphery of the round terminal posts of an electric storage battery, comprising:
   handle means including a pair of juxtaposed arms movable toward and away from each other;
   a pair of post cleaning jaws each having a swiveling connection to a respective arm, said jaws being disposed between said arms and confronting each other to receive a terminal post therebetween, said jaws being arcuately curved about parallel axes and the jaws having post abrading faces with curvatures less than that of the terminal post to only partially engage the post periphery at opposite sides of the post, the swiveling connection permitting the jaws to oscillate about swivel axes parallel to said first-mentioned jaw axes and to reorient on the post in conformity with the shape of the pose and in relation to the direction of rotary movement of the jaws on the post as the jaws are oscillated first in one direction and then in the other direction to progressively utilize adjacent areas of the abrading faces and thereby effect a smooth abrading, sliding and self-cleaning of the jaws as scale and corrosion are removed from the post.

2. The tool according to claim 1 wherein the swiveling connection between each jaw and the corresponding arm includes a socket in the arm and a ball member on the jaw and confined in the socket of the arm.

3. The battery post cleaning tool according to claim 1 wherein the abrading means include a plurality of elongate and substantially linear teeth arranged to scrape and polish the periphery of the terminal.

4. A tool for cleaning the periphery of the round terminal post of an electric storage battery, comprising:
   handle means including a pair of juxtaposed arms movable toward and away from each other, said arms havng socket openings facing inwardly toward each other;
   a pair of post-cleaning jaws disposed between said juxtaposed arms and confronting each other to receive a terminal post therebetween, said jaws having arcuately curved post-abrading faces to embrace the post periphery to clean and remove corrosion when the arms and jaws are oscillated first in one direction around the post and then in the other direction around the post;
   a pair of rigid mounting balls, each affixed on a respective jaw and at the side opposite the abrading face, each of said balls being inserted into the socket opening of the adjacent arm to swively mount the jaw; and
   a pair of spring clips each removably encompassing a respective arm adjacent said socket and said spring clips each having opposite ends partially obstructing the socket to engage and retain the jaw-mounting ball therein.

5. The battery post cleaning tool according to claim 4 wherein the post-abrading faces of the jaws have curvatures less than that of the terminal post to only partially engage the post periphery at opposite sides of the post whereby varying areas of said arcuately curved post-abrading faces successively engage and disengage the post periphery as the jaws are oscillated first in one direction around the post and then in the other direction around the post.

6. The battery post cleaning tool according to claim 5 wherein said handles also have arcuately curved and outwardly facing abrading faces for insertion into and abrasion against the inner periphery of the cable lugs for attachment to the battery post.

* * * * *